J. H. REED.
PROCESS AND APPARATUS FOR THE RECOVERY OF FLOAT METAL FROM WATER CONTAINING THE SAME.
APPLICATION FILED JULY 25, 1917.
1,262,984.
Patented Apr. 16, 1918
2 SHEETS—SHEET 1.
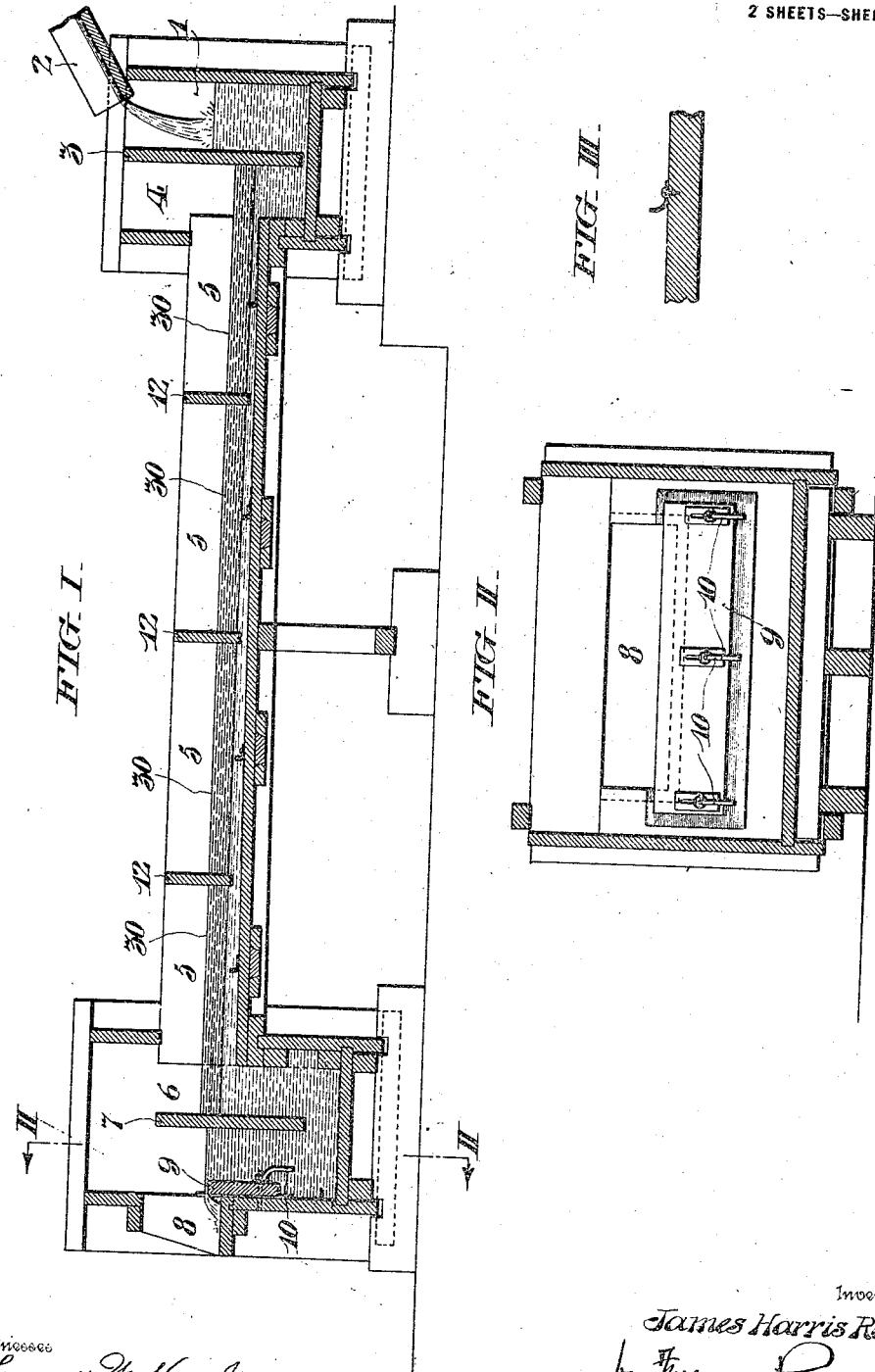

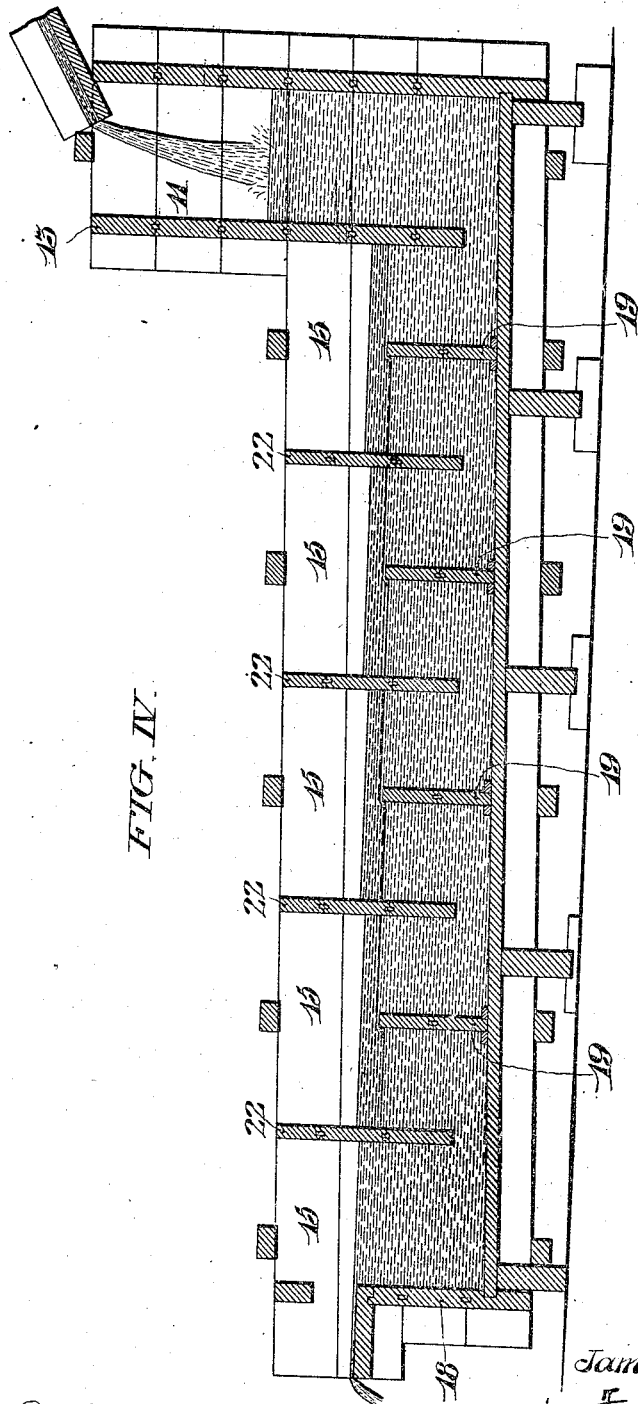

UNITED STATES PATENT OFFICE.

JAMES HARRIS REED, OF PHILADELPHIA, PENNSYLVANIA.

PROCESS AND APPARATUS FOR THE RECOVERY OF FLOAT METAL FROM WATER CONTAINING THE SAME.

1,262,984.

Specification of Letters Patent. Patented Apr. 16, 1918.

Application filed July 25, 1917. Serial No. 182,639.

*To all whom it may concern:*

Be it known that I, JAMES HARRIS REED, of Philadelphia, in the county of Philadelphia and State of Pennsylvania, have invented certain new and useful Improvements in Processes and Apparatus for the Recovery of Float Metal from Water Containing the Same, whereof the following is a specification, reference being had to the accompanying drawings.

My process relates to the recovery of gold or other precious metal from water containing the same, by means of flotation, and relates more particularly to the maintenance of a stratum of oil in fixed suspension upon and over a moving body of water containing float metal with provision of means whereby the water is deflected up against the overlying surface of the oil in such a way that the precious metal floating therein is caught and retained by the oil. To this end it involves means for conducting and controlling a constant flow of the water and means for maintaining a stratum of oil in suspension thereover.

In the accompanying drawings, Figure I, is a longitudinal sectional view of an apparatus embodying my invention and suitable for the practice of my process.

Fig. II, is a cross section along the line II, II, of Fig. I.

Fig. III, is a detail sectional view of one of the riffle strips.

Fig. IV, is a longitudinal sectional view of a modified apparatus for practising the same process under conditions where a larger body of water is to be handled.

Referring to Fig. I, at the right hand end of the apparatus as shown in the drawings, is a feed chamber 1, into which water containing float metal is discharged, as by a trough 2, which preferably leads from a settling tank, in order that the water may first be freed from sediment. The feed chamber is separated by a trap partition 3, from upflow compartment 4, the rate of the flow of the water through the apparatus being to some extent controlled by the space between the bottom of partition 3, and the bottoms of the chambers 1, and 4. The upflow compartment communicates with a continuous passage-way 5, the length of which depends upon the nature and quantity of the material to be treated. This passage-way leads to and discharges into a discharge receptacle 6, divided by a trap partition 7. The discharge receptacle is fitted with an outflow aperture 8, the height of the water therein being controlled by the overflow partition 9, which is adjustable in height by means of a pin and slot connection controlled by the wedge handles 10.

At intervals along the bottom of the passage-way 5, there are placed racks or pegs or riffle strips, in such a way as to agitate and deflect the water, causing the same to pass in comparatively thin films over and around the same. These devices may vary in character, a suitable device being shown on an enlarged scale in Fig. III, which represents in cross section an upturned metal riffle strip which is suitable for accomplishing the purpose. These strips reach almost to the lower surface of the oil, compelling all of the water to flow in a thin film in close proximity to the overlying oil.

Upon the surface of the water flowing through the passage-way is a body of oil 30, preferably a suitable petroleum distillate of sufficient depth to maintain a constant body of the same lying over the entire surface of the water in the passage-way. It is in order to maintain this stratum of oil in permanent suspension in the desired position that the trap portitions 3, and 7, are provided guarding the inflow and outflow of the water and preventing the oil from being discharged from over the water at either end.

In case the passage-way is of a considerable length any creeping of the oil along with the flow of the water may be prevented by vertical baffles 12, mounted across the passage-way and reaching down below the surface of the water and therefore completely holding back the overlying layer of oil.

In the operation of my process the overflow partition 9, is initially adjusted at a height to maintain the water in the passage-way at a depth which is found to be most suitable for the practice of my process. The water containing float metal is then introduced into the feed chamber and after flowing through the passage-way 5, is discharged from the discharge receptacle 6. During this progress along the passage-way, the water is constantly agitated and deflected upward against the lower surface of the overlying body of oil thus bringing the float metal contained in the water into intimate contact with the same. The water is thereby caused to yield up its float particles to the oil by virtue of the superior attraction of the oil for such minute particles of precious metal, a physical phenomenon which is well understood, but which so far as I am aware has not been availed of in practising any process in which the water containing these particles floating therein is deflected upwardly into contact with the lower surface of a stratum of oil in fixed suspension upon a body of water.

In Fig. IV, of the drawings, a somewhat similar apparatus is shown for practising the same process. In this case the feeding chamber 11, is deeper in order to hold a larger body of liquid and the trap partition 13, does not reach to so near the bottom of the receptacle. This apparatus is therefore suitable for operation with a much larger flow of water, as in the case of placer mining where a large flow of liquid may be utilized in my process. The passage-way 15, is interrupted by a series of baffles 19, reaching a considerable distance from the bottom of the passage-way and thus deflecting upward the large body of water passing through the apparatus. Between each baffle plate 19, is mounted transversely a strip 22, reaching from the top of the passage-way down well below the surface of the water flowing therethrough. These act as auxiliary traps and serve along with the trap partition 13, to hold in place the stratum of oil resting upon the surface of the water passing through the passage-way toward the end partition 18, over which the water is discharged.

It will be observed that the top of each successive baffle strip 19, is slightly lower, thereby occasioning a step by step decrease in the level of the water in the passage-way which in turn may be taken up by corresponding inclination of the bottom of the passage-way, thus admitting a larger and freer flow of water through the apparatus. But each of the baffle strips 19, reaches almost to the oil, so that water is compelled to flow in a thin film in close contact with the overlying oil.

The process as practised in this modified form of apparatus is substantially the same as that which I have already described with the exception that the apparatus is upon a scale and of a character calculated to handle a larger flow of liquid, and the shape and position of the baffles 19, and 22, are such as to permit the body of oil to lie so close to the body of water passing beneath as to admit a change of level in the lower surface of the body of oil with each of the baffle strips 19. Under these circumstances the body of water as it flows beneath the oil is deflected upward by the baffle-strips 19 causing a wave-like agitation and bringing a thin film of the metal-carrying water into contact with the oil as the water passes over each successive partition.

It will be understood that my process is capable of being carried on in apparatus of various forms of construction and is not confined to the forms of apparatus which I have described although they are those which I have found to be most suitable for its practice.

Having thus described my invention, I claim:

1. The process of recovering float metal from a moving body of water which consists in maintaining a stratum of oil in fixed suspension upon said moving body of water and deflecting the float metal in the underflowing water up against the overlying oil.

2. An apparatus for recovering float metal from water, which comprises a waterway; means for maintaining a flow therethrough of water carrying float metal; a stratum of oil overlying the flowing water; trap partitions reaching below the surface of the water and trapping the oil, whereby the stratum of oil is maintained in fixed suspension upon the underflowing water; and baffle strips reaching up from the bottom of the water-way almost to the oil, whereby a thin film of water is caused to flow over said baffle strips bringing the float metal which it carries into contact with the overlying oil.

In testimony whereof, I have hereunto signed my name at Philadelphia, Pennsylvania, this twenty-fourth day of July, 1917.

JAMES HARRIS REED.

Witnesses:
JAMES H. BELL,
E. L. FULLERTON.